March 23, 1937. L. S. SAAIMAN ET AL 2,074,593
MEANS FOR FIXING WIRE CLAMPS AROUND HOSE AND SIMILAR PIPES
Filed April 17, 1935
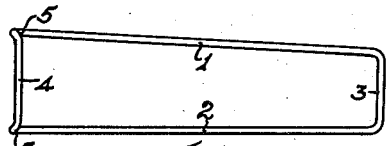
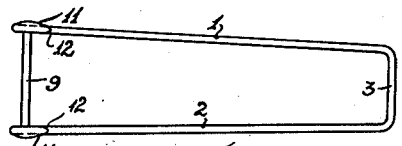
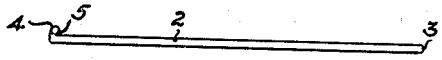
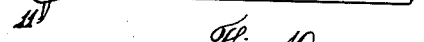
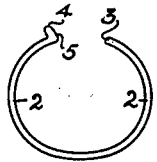
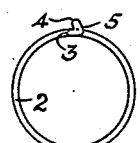
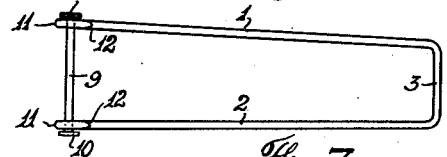
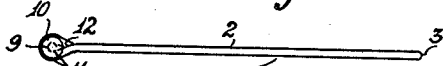
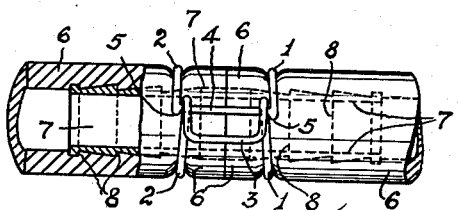
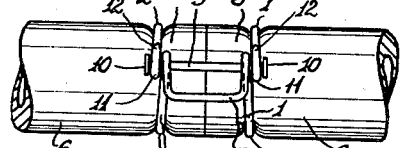
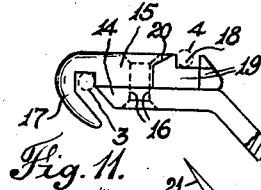
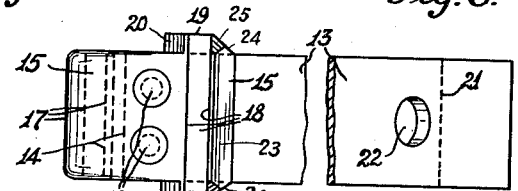
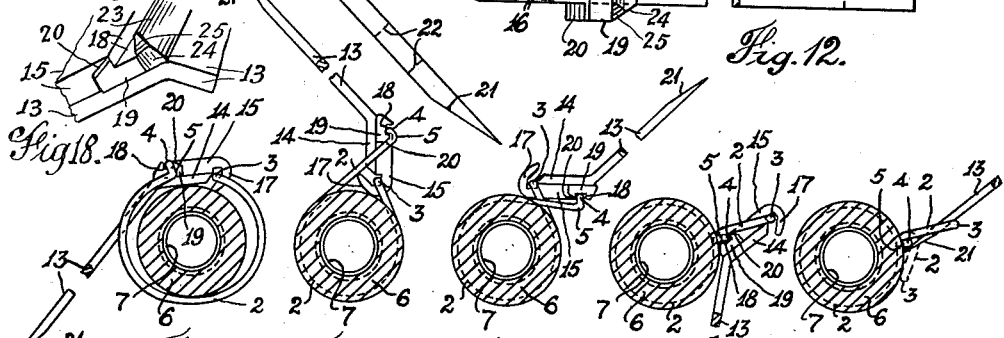
Witness:
Arthur Thompson
Inventors:
Louis Stephanus Saaiman
Norris Barker Patented Mar. 23, 1937

2,074,593

UNITED STATES PATENT OFFICE 2,074,593

MEANS FOR FIXING WIRE CLAMPS AROUND HOSE AND SIMILAR PIPES

Louis Stephanus Saaiman and Norris Barker, Johannesburg, Transvaal, Union of South Africa Application April 17, 1935, Serial No. 16,852
In Union of South Africa January 15, 1935

4 Claims. (Cl. 81—9.3)

This invention appertains to means for fixing wire clamps which consist of a complete loop or endless wire frame around hose and similar pipes. Such clamps comprise a pair of longitudinal or side members and a pair of end or transverse members joining the corresponding ends of said side members. The one end or transverse member of the frame or loop is shorter than the other, so that the side members diverge in the direction of the wider end or longer transverse member. It is especially applicable for use in fixing hosepipes and other resilient pipes or tubes to hosepipe connections or other rigid pieces around which said pipes or tubes require to be fixed in a fluid-tight manner.

The means according to our invention can be used for fixing clamps in securing air and water supply pipes to hosepipe connections used with rock-drilling machines, and for making joints between the ends of pieces of hosepipe.

The object of the invention is to provide a simple and efficient means implement or tool for fixing the clamp in position around the hosepipe or the like, to make a reliable fluid-tight joint between it and the connection.

Clamps of the kind referred to can be used for making the joint between the abutting ends of two pieces of hosepipe and the connection which is placed within the pipes at said abutting ends, or a separate clamp can be used for connecting each piece of hosepipe to the connection.

The means, implement or tool according to the invention is constructed in the form of a lever or member, a portion at one end of which is bent at a suitable angle or inclination and made or fashioned at the outer end to provide a hook, and at the other side to provide a transverse groove, near the bend. The part providing the hook on the one side and the transverse groove or recess on the other may be made as a part separate from the bent lever, and be attached to the bent portion of the latter, as by rivets or welding. The hooked piece is constructed to form shoulders or lateral abutments at the ends of the groove. The other or handle end of the lever is made of a suitable width to pass freely through the narrower end of the frame in finally tightening the clamp, and the extremity is bevelled to facilitate its insertion under the longer transverse member at the wider end of the frame to force the shorter transverse member at the narrower end inwards finally to secure the clamp.

The hooked extremity of the lever is adapted to engage the shorter transverse end member of the frame, and the groove on the opposite side is engaged by the other and longer transverse member when operating the lever to strain and fix the clamp around the hosepipe.

The invention will be more fully explained with the aid of the accompanying sheet of drawings, wherein Fig. 1 is a part sectional elevation of a form of the clamp fixed by the tool and shown securing the abutting ends of two pieces of hosepipe around a common hosepipe connection.

Fig. 2 is a plan view of the clamp frame shown in Fig. 1, in a distended position.

Fig. 3 is a side elevation of Fig. 2.

Fig. 4 is a side elevation of the clamp frame bent into circular form.

Fig. 5 is a side elevation of the clamp slightly opened from the circular form to facilitate its being placed around the hosepipe and engaged by the tool or implement.

Fig. 6 is an elevation of another form of the clamp fixed by the tool and shown securing two abutting pieces of hosepipe around a connection.

Figs. 7 and 8 are plan and side elevation respectively of the clamp shown in Fig. 6, in a distended position.

Figs. 9 and 10 are views similar to Figs. 7 and 8 of another construction of the clamp frame.

Fig. 11 is a side elevation, drawn to an enlarged scale, of the implement or tool according to the invention for applying the clamp.

Fig. 12 is a plan view of Fig. 11, and

Figs. 13, 14, 15, 16 and 17 are views illustrating the method of securing the clamp shown in Figs. 1 to 5 around the hosepipe by means of the tool or implement.

Fig. 18 is a fragmentary view of a portion of the tool illustrating certain details of construction.

In Figs. 1 to 5 of the drawing, the numerals 1, 2, denote the side members of the frame, and 3 the transverse member at the narrower end thereof. 4 is the transverse member at the other and wider end of the frame. In this construction the side members 1, 2, of the frame converge in the direction of the narrower end or transverse member 3, so that the passing of the narrower end 3 of the frame under the longer transverse member 4 is easily effected. The transverse member 4 at the wider end is, as shown, bent slightly out of the plane of the members 1, 2, as indicated at 5, to a distance substantially equal to the thickness of the wire of the clamp. The inclination at which the transverse member 4 is bent backwards is such that when the clamp is arranged in position and strained to tighten it around the hosepipe 6, the bent parts 5 of the transverse member 4 take up substantially radial positions and place the side members 1, 2, in position completely to encircle the hosepipes 6 at the same radius all around the pipes. Consequent on this construction, as the hosepipe 6 is completely encircled by the clamp, the liability of leakage at or near the point of engagement of the smaller end of the frame and the transverse member 4 is prevented.

The frame, if made of a comparatively hard wire, is bent into substantially circular formation, as illustrated in Fig. 4, and subsequently opened or expanded when required to be placed in position around the hosepipe 6, as shown in Fig. 5.

7, in Fig. 1, represents the double-ended connection, fashioned, as usual, with annular shoulders 8, and inserted into the abutting ends of the two pieces of hosepipe 6.

In Fig. 1 one of the clamps is shown employed for making the joint between the ends of the two pieces of pipe 6 and the connection 7. Instead of employing a single clamp as shown in Fig. 1, a separate clamp may be used for clamping each hosepipe end 6 to the connection.

In Figs. 6, 7 and 8, the wider end of the frame is closed by means of a bar 9, fashioned at each end with a head or enlargement 10, and arranged in eyes 11 formed at the ends of the side members 1, 2, at the wider end of the frame. The wire is bent as indicated at 12 to form the eye 11 preferably of pear shape. This ensures that the clamp will tightly embrace the hosepipe 6 through a complete circle, and obviate any opening of the eyes 11 in straining and securing the clamp.

In Figs. 9 and 10, the ends of the transverse member or bar 9 at the wider end of the frame may be brazed or welded in the eyes 11.

In Figs. 11 and 12 the tool or implement according to this invention which is used for fixing the clamp in position around the hosepipe 6 is illustrated. 13 represents the lever, and 14 the end portion thereof which is bent at an obtuse angle to the part 13. 15 is the hooked and grooved piece which is shown secured to the bent portion 14 by the rivets 16. The piece 15 at the outer end and one side is fashioned in the form of a hook 17, and at the inner end and other side is constructed with a transverse groove or recess 18. The inner face of the hook 17 is at an acute angle to the surface in which the groove 18 is formed. The engagement by the hook of the narrow transverse member 3 and the engagement of the wider transverse member 4 in the groove 18 is ensured during the complete rotational movement of the tool in fixing the clamp. The piece 15 of the tool is fashioned at both sides with lateral projections 19, and the groove 18 formed in said piece 15 is continued across said lateral projections 19, forming an open-ended groove extending completely across the piece 15.

The lateral projections 19 are bevelled inwardly, as indicated at 20, from near the inner edge of the groove or recess 18, forwardly or in the direction of the hook 17. The bevelling 20 of the lateral projections 19 affords the requisite clearance for the side members 1, 2, near the narrow end of the clamp, whilst the projections 19 provide for the engagement in the groove 18 of the wider end transverse member of the clamp for the full width of the clamp. This obviates the kinking or bending of the sides of the frame near the shorter transverse member. The inner end of the piece 15, transversely of the lever 13, is bevelled rearwardly and inwardly, or in the opposite direction to the bevel 20 of the lateral projections 19, as indicated at 23, to enable the tool to be turned over to a greater extent than would otherwise be possible—see Fig. 16—and so lock or securely retain the wider transverse member 4 in the bight formed by the side members 1, 2, near the narrower end of the clamp. The sides of the projections are cut away or bevelled off at the back, as indicated at 24, and the lateral projections 19 are further bevelled off or rounded at the corners at the rear of the groove 18, as indicated at 25. The shaping or bevelling of the tool at 24 and 25 ensures that the transverse member at the wider end of the clamp will be forced into the bight formed in the side members 1, 2, when brought into the position shown in Fig. 16. The bevelling of the corners at 25 enables the rear edge of the groove 18 to clear the side members 1, 2, of the clamp near the bight, while the bevelling at 24 affords the requisite clearance to enable the tool to roll in contact with the side members 1, 2, beyond the transverse member at the wider end of the clamp. The other or handle end of the lever 13 is bevelled as indicated at 21, and may be provided, as shown, with a hole 22 for use in attaching it, if desired, to the person of the user.

In Figs. 13 to 17 the manner of using the tool or implement to strain and fix the clamp around the hosepipe 6 is depicted. As shown in Fig. 13, the hooked extremity 17 engages with the underside of the transverse bar 3 at the narrower end of the frame, and the transverse member 4 at the wider end of the frame engages in the groove or recess 18. From the position shown in Fig. 13 the lever is turned over in a clockwise direction to cause the hooked extremity 17 to pass between the side members 1, 2, of the frame—see Fig. 14— and to force the transverse member 4 at the wider end of the frame or loop round the hosepipe 6, with a toggle action, into the position shown in Fig. 15. Rotation of the tool is continued into the position shown in Fig. 16 in which the clamp is strained and bent initially to secure and lock it. The tool is now removed from the clamp, and the other and bevelled end 21 inserted in the narrower end of the frame, with the bevelled extremity engaging with the transverse member 4— see Fig. 17. The tool is then pulled over, and, by engaging the transverse member 3, forces the outwardly projecting narrower end portion of the frame against the side members 1, 2, and the surface of the pipe 6, as shown in dotted lines in Fig. 17, and as shown in Fig. 1.

What we claim as our invention and desire to protect by Letters Patent is:—

1. A tool for straining and securing wire clamps in the form of a complete loop, constructed in the form of a lever bent at one end and shaped at the extremity of the bent end portion on the one side in the form of a hook, and fashioned near the bend with lateral projections, and having a transverse groove in said bent end portion on the side opposite the hook, which groove is continued across the projections, as set forth.

2. A tool for straining and securing wire clamps in the form of a complete loop, comprising end members of different length and side members, which tool is constructed in the form of a lever bent at one end and shaped at the extremity of the bent end portion on the one side in the form of a hook, and fashioned near the bend with lateral projections, and having a transverse groove in said bent end portion on the side opposite the hook, which groove is continued across the projections, the lateral projections being inclined forwardly and inwardly in the direction of the hook-shaped extremity to provide clearance for the side members of the clamp near the narrower end thereof, as set forth.

3. A tool for straining and securing wire clamps in the form of a complete loop, comprising end members of different length and side members, which tool is constructed in the form of a lever having a bent head portion at one end and shaped at the extremity of the head portion on the one side in the form of a hook, and fashioned with lateral projections, and having a transverse groove in said head portion on the side opposite the hook, which groove is continued across the projections, the head beyond the groove and between the projections being bevelled rearwardly and inwardly to enable the tool to be turned to a sufficient extent to lock the wider transverse member in the bight formed by the side members near the narrower end of the clamp, as set forth.

4. A tool for straining and securing wire clamps in the form of a complete loop, comprising end members of different length and side members, which tool is constructed in the form of a lever having a bent head portion at one end and shaped at the extremity of the head portion on the one side in the form of a hook, and fashioned with lateral projections, and having a transverse groove in said head portion on the side opposite the hook, which groove is continued across the projections, the head portion at the back of the groove and between the projections being bevelled rearwardly and inwardly to enable the tool to be turned to a sufficient extent to lock the transverse member at the wider end of the loop in the bight formed by the side members near the narrower end of the loop, and the sides of the projections being bevelled off at the back, and further bevelled at the corners at the rear of the groove, as and for the purpose set forth.

LOUIS STEPHANUS SAAIMAN.
NORRIS BARKER.